(No Model.)

R. N. McKAY.
CAR COUPLING.

No. 254,033. Patented Feb. 21, 1882.

Attest:
Geo. Hebard.
Delle Crittenden.

Inventor:
R. N. McKay.
By E. B. Whitmore, Atty.

UNITED STATES PATENT OFFICE.

RICHARD N. McKAY, OF CARLTON, NEW YORK.

CAR-COUPLING.

SPECIFICATION forming part of Letters Patent No. 254,033, dated February 21, 1882.

Application filed September 19, 1881. (No model.)

*To all whom it may concern:*

Be it known that I, RICHARD N. MCKAY, of Carlton, in the county of Orleans and State of New York, have invented a new and useful Improvement in Car-Couplers, which improvement is fully set forth in the following specification and accompanying drawings.

The object of my invention is to produce a coupling for ordinary railway-cars which shall be cheap and convenient, and that may be safely operated by a person standing upon the platform of the car or upon the ground at one side of the car, said invention being set forth in the following specification and more particularly pointed out in the claims.

Figure 1:
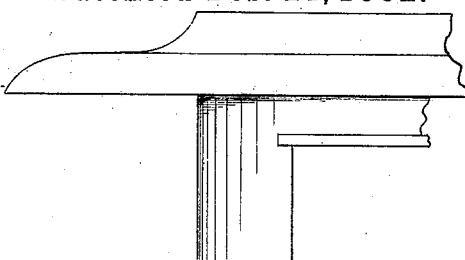
Figure 2:
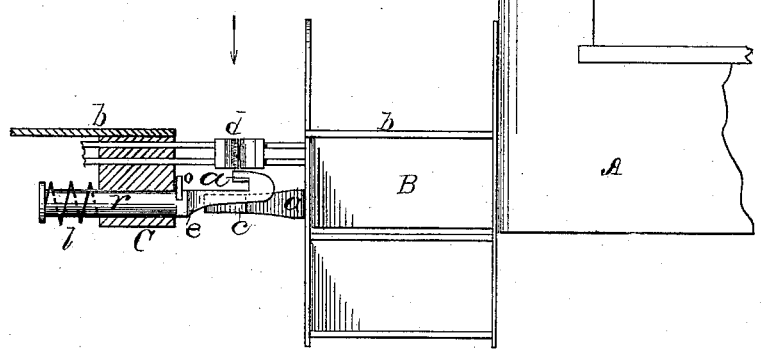

In the drawings, Figure 1 shows a side elevation of one end of a car, and a portion of the platform-timbers of an adjoining car centrally sectioned, with my improved coupling device attached in place; Fig. 2, a view of parts of the same view indicated by arrow in Fig. 1; and Fig. 3, a view at the end of a car, showing more clearly the manner of operating said coupling device.

In the figures, A represents a portion of an ordinary railroad-car, B the steps thereof, C the platform end timber, and $b$ the platform-floor, all of ordinary construction.

$d$ are some suitable form of bumpers for the cars.

The coupling device consists of two hook-shaped pieces, $a$ and $e$, one for each car, arranged in the place of ordinary coupling devices, which hook-shaped pieces or hooks are designed to be rotated in their bearings in the timbers of the platforms of the cars for the purpose of coupling or uncoupling said cars. When said hooks are interlocked, as shown in Fig. 2, by the hook $a$, and the dotted position of the hook $e$, the two cars are effectually coupled together, the bumpers $d$ preventing the cars approaching so near together as to unlock the hooks by pushing apart.

Figs. 1 and 2 show the positions of the hooks as two cars are brought together in readiness to be coupled. When the cars are in position, if the hook $e$ be rotated or turned in its bearing one-fourth way around, the hooks will become interlocked or coupled, as above described. Reversing the motion will uncouple said hooks. The hook $e$, which is in every way like the hook $a$, is provided with a part, $c$, projecting backward from the inner surface of the hook toward the platform of the car, and forms a third side of the inclosure of the hook. These parts $c\,c$ of the hooks, when the latter are locked together, prevent them becoming unlocked by the side swaying of the cars, which is constant while they are in motion. This in the class of hook-coupling devices is important. The hooks, it will be observed, are not in line with the axes of their respective cylindrical shanks $r$, but stand at one side of the same, on account of which, when the hooks are turned in the timbers C of the platforms above mentioned, the retroverted parts $c\,c$ will move through an arc of a circle of larger radius than that of the bearing $r$. On account of the hooks being offset from their respective centers of motion they conveniently pass each other when one is turned to a horizontal position and the other vertically, as shown in Fig. 2. The hooks are formed with sufficient metal at $n$, and slotted, as shown at $v$, to receive an end of an ordinary coupling-link as a matter of convenience, should one of the cars to be coupled be provided with the old-style coupling device.

Figure 3:
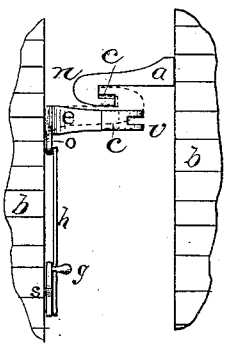

Fig. 3 shows the manner of rotating or turning the hooks by means of a lever, $g$, fulcrumed upon a pin, $s$, projecting from the face of the timber C of the platform, said lever being connected with an arm, $o$, of the hook $e$ by means of a rod, $h$. The full-line positions of the parts show them as before the coupling of the hooks has been effected, the dotted positions after the coupling has been performed. The hooks are supplied with some suitable springs, $l$, for the usual purpose of giving elasticity to the draft of the cars.

This plan of coupling for cars is simple, effectual, and cheaply constructed, and so far as the coupling proper is concerned contains but few parts, there being but one hook at each end of a car, and at no time is it necessary for an attendant to go between two cars to effect the coupling together of the same.

I claim as my invention—

1. In combination with the timbers of a railway-car platform, a coupling device consisting of a cylindrical part, $r$, with offset hook $e$, provided with a retroverted part, $c$, and means to turn said hook in its bearing, substantially as described.

2. In combination, the timber C of the platform, and the offset coupling-hook $e$, with retroverted part $c$, said hook being provided with a slot, $v$, substantially as and for the purpose set forth.

RICHARD N. McKAY.

Witnesses:
E. B. WHITMORE,
M. D. PHILLIPS.